United States Patent
Ozaki

(10) Patent No.: US 6,559,930 B2
(45) Date of Patent: May 6, 2003

(54) IMAGE EXPOSURE APPARATUS

(75) Inventor: Takao Ozaki, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/876,129

(22) Filed: Jun. 8, 2001

(65) Prior Publication Data

US 2001/0052972 A1 Dec. 20, 2001

(30) Foreign Application Priority Data

Jun. 9, 2000 (JP) ........................................ 2000-173772

(51) Int. Cl.[7] ........................ G03B 27/00; G03B 27/32; G03B 27/52
(52) U.S. Cl. .......................... 355/405; 355/27; 355/40
(58) Field of Search .............................. 355/27–29, 40, 355/41, 405, 407, 75; 347/104, 215, 218, 262; 271/258.01, 259

(56) References Cited

U.S. PATENT DOCUMENTS

| | | | | |
|---|---|---|---|---|
| 4,143,960 A | * | 3/1979 | Tracy | ........................ 355/3 R |
| 4,718,659 A | * | 1/1988 | Hayashi | ...................... 271/259 |
| 5,532,722 A | * | 7/1996 | Namiki et al. | ............... 347/153 |
| 6,144,441 A | * | 11/2000 | Morita et al. | .................. 355/29 |

* cited by examiner

Primary Examiner—Henry Hung Nguyen
(74) Attorney, Agent, or Firm—Sughrue Mion, PLLC

(57) ABSTRACT

An image exposure apparatus in which positioning of a photosensitive material, such as a printing plate to be wound around a rotating drum, is implemented in a small space. A turning unit and a transport conveyor are provided at a plate supply/transport section. The turning unit trains the printing plate about the rotating drum and feeds the plate to the transport conveyor. At the transport conveyor, the printing plate is transported and a leading end of the printing plate abuts pin rollers. Then, a positioning motor is operated to move the turning unit and the transport conveyor integrally. Thus, the printing plate abuts another pin roller in a width direction to implement positioning of the printing plate. The leading end of the positioned printing plate is then fed to a puncher by the transport conveyor.

17 Claims, 5 Drawing Sheets

F I G. 2
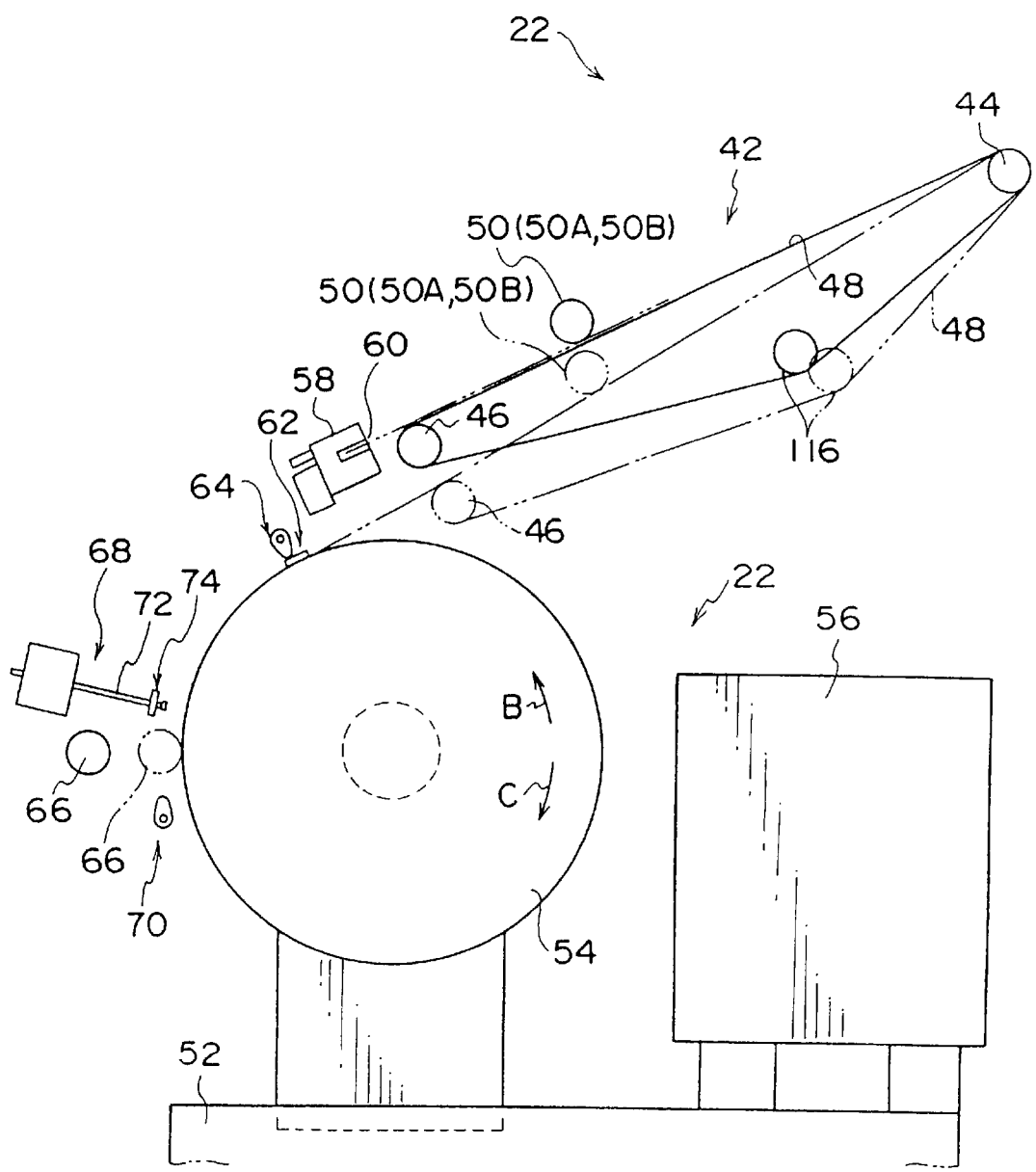

IMAGE EXPOSURE APPARATUS

BACKGROUND OF THE INVENTION

1. Field of the Invention

The present invention relates to an image exposure apparatus which winds a photosensitive material on a peripheral face of a rotating drum or the like and scanningly exposes the photosensitive material.

2. Description of the Related Art

In general, for printing, a photosensitive lithographic printing plate (hereafter, referred to as a printing plate) is employed in which a photosensitive layer is formed on a sheet-like support such as an aluminum sheet. Such a printing plate has a size (length and width) which corresponds, for example, to the size (length and width) of a print.

Among image exposure apparatuses that expose an image on a printing plate, there is one in which a printing plate is wound around a rotating drum, and by irradiating a light beam according to image data onto the printing plate while rotating the printing plate together with the rotating drum, the printing plate is scanningly exposed.

Even in this type of image exposure apparatus, it is necessary to precisely form an image at a predetermined position of the printing plate. Thus, among image exposure apparatuses, for example, there is one in which a puncher is provided, a notch for positioning is formed at a tip of the printing plate by the puncher, and a pin for positioning provided in a protruding condition on a peripheral surface of a rotating drum enters the notch when the printing plate is wound around the rotating drum so as to position the printing plate.

In order to position the printing plate on the rotating drum precisely, it is necessary to precisely position the printing plate with respect to the puncher.

In general, for positioning the printing plate, the printing plate is placed on a table for positioning and is moved in a vertical direction and in a horizontal direction so as to abut the pin for positioning. However, in order to implement this type of positioning, it is necessary to provide a table whose size is larger than that of the printing plate. Thus, the apparatus becomes quite large-sized. Further, it is necessary to remove the printing plate whose positioning is finished from the table and wind around the rotating drum. Thus, a transport mechanism for this operation is necessary.

As a method for positioning the printing plate, a method has been devised wherein the printing plate is sucked by a sucker so as to make the plate abut a positioning pin. However, in this positioning method, it is necessary to reduce transport speed at the time when the printing plate abuts the positioning pin or to reduce suction of the sucker or both, in order to implement precise positioning while preventing damage to the printing plate. When the transport speed of the printing plate is reduced, exposure processing time becomes long, and rapid processing becomes difficult. In order to decrease the suction of the sucker acting on the printing plate, a high cost, complex switching mechanism is needed.

SUMMARY OF THE INVENTION

The present invention has been developed considering the facts described above, and an object of the present invention is to present an image exposure apparatus having a simple structure in which a photosensitive material to be wound around a rotating drum can be reliably positioned in a small space.

In an image exposure apparatus according to a first aspect of the present invention, positioning of a sheet-like photosensitive material at a rotating drum is enabled by positioning the photosensitive material at a predetermined position before the photosensitive material is wound onto a peripheral surface of the rotating drum in order to be scanningly exposed, and the image exposure apparatus includes: a transport device which imparts transport force to each of two end portions in a width direction of the photosensitive material, which width direction is perpendicular to a transport direction of the photosensitive material, and transports the photosensitive material while maintaining the photosensitive material in a state in which the photosensitive material is tilted at a predetermined inclination; a first positioning device which stops each of two end portions in the width direction of a leading end of the photosensitive material, which is being transported by the transport device, at a predetermined position; a moving device which moves the transport device and the photosensitive material integrally along the width direction of the photosensitive material after the photosensitive material has been stopped at the predetermined position by the first positioning device; and a second positioning device which stops the photosensitive material, which is moved by the moving device, at a predetermined position.

The transport device imparts the transport force to both respective side edges in the width direction of the photosensitive material, such as a printing plate, to transport the photosensitive material in the state in which the photosensitive material is tilted at a predetermined inclination. The first positioning device stops both end portions in the width direction of the leading end of the photosensitive material transported by the transport device so that both end portions are at predetermined positions. Thus, the photosensitive material is positioned with respect to the transport direction.

The moving device moves the transport device along the width direction of the photosensitive material such that the photosensitive material is moved integrally therewith along the width direction. The second positioning device stops the photosensitive material moved by the moving device at a predetermined position, so as to implement positioning along the width direction of the photosensitive material.

When positioning is implemented with respect to the transport direction and the width direction perpendicular to the transport direction as described above, because the photosensitive material is tilted, positioning can be implemented in a smaller space than positioning the photosensitive material in a horizontal state, whereby an installation space for the apparatus can be made smaller. Further, since positioning of the photosensitive material is implemented on the transport device, transporting the photosensitive material whose positioning is finished can be easy.

In the image exposure apparatus of the present invention, preferably, the transport device includes: a plurality of transport belts provided substantially perpendicular to the direction in which the photosensitive material is transported, with the transport belts being disposed at predetermined intervals along the width direction of the photosensitive material; and a transport roller provided substantially perpendicular to the direction in which the photosensitive material is transported, and with the transport roller disposed to face each of end portions in the width direction of the photosensitive material, the transport roller pinches the photosensitive material between the transport belts and the transport roller and to impart a transporting force to the photosensitive material. Further, preferably, the transport roller is divided into a plurality of rollers along a direction substantially perpendicular to the transport direction of the photosensitive material. The plural rollers obtained by dividing the transport roller are preferably mutually relatively rotatable.

By providing rollers opposed to both respective end portions of the width direction of the photosensitive material, the end portions of the width direction of the photosensitive material can be separately held and can be imparted with transport force between the respective rollers and the transport belts.

Even when one end portion side of the width direction of the photosensitive material has been stopped at the predetermined position by the first positioning device, by moving the other end portion side of the photosensitive material, skew with respect to the transport direction of the photosensitive material can be readily remedied.

In the image exposure apparatus of the present invention, the transport device preferably includes a winding device that winds the photosensitive material around the roller and feeds the photosensitive material toward the transport belts, and the moving device preferably moves the winding device and the transport belts integrally.

Thus, since positioning of the photosensitive material can be implemented in a state in which a leading end side of the photosensitive material is tilted on the transport belt and a trailing end side of the photosensitive material is wound around the roller, positioning can be implemented in an extremely small space, even for a photosensitive material whose length along the transport direction is long, and the apparatus can be made compact.

The image exposure apparatus of the present invention preferably further includes at least one cassette which accommodates the photosensitive material. The winding device preferably moves horizontally along the transport direction. The transport device preferably adjusts an angle thereof interlocking with the horizontal movement of the winding device. The winding device preferably has a guide plate that guides the photosensitive material toward the transport device. This guide plate preferably adjusts an angle thereof interlocking with the horizontal movement of the winding device.

Various sizes of photosensitive materials can be combined, depending on service conditions, and further the winding device moves horizontally along the transport direction, whereby photosensitive materials can be supplied from the plurality of cassettes by one apparatus. The transport device and the guide plate adjust their angles in response to the horizontal movement of the winding device such that not only can the photosensitive material be smoothly supplied but also the apparatus can be made compact.

In the image exposure apparatus of the present invention, the winding device preferably has a plurality of winding belts arranged at predetermined intervals along an axial direction of the roller such that the photosensitive material is pinched by the roller and the winding belts, and fed out.

The plurality of winding belts are arranged along the axial direction of the roller that winds the photosensitive material, and the photosensitive material is pinched between the roller and the winding belts, whereby both side edges of the width direction of the photosensitive material can be individually held, and movement of the trailing end side of the photosensitive material becomes easy when a skew with respect to the transport direction of the photosensitive material is being remedied by the first positioning device.

The image exposure apparatus of the present invention preferably further includes a puncher that forms a notch for positioning in the photosensitive material. Further, the rotating drum preferably has a pinch device that detachably fixes the photosensitive material on the rotating drum. Moreover, the transport device preferably transports the photosensitive material toward the puncher or the rotating drum or both in a state in which the photosensitive material is moved in the width direction by the moving device.

At this time, since the transport device is moved together with the photosensitive material integrally by the moving device, the transport direction of the photosensitive material is not skewed by the transport device. Thus, the photosensitive material whose positioning is finished can be fed out without occurring dislocation. By providing a notch for positioning in the photosensitive material and providing the pinch device that detachably fixes the photosensitive material to the rotating drum, positioning time of the photosensitive material can be shortened and positioning accuracy can be improved.

BRIEF DESCRIPTION OF THE DRAWINGS

FIG. 2 is a schematic structural view of a recording section provided in the image exposure apparatus.

DESCRIPTION OF THE PREFERRED EMBODIMENT

Figure 1:
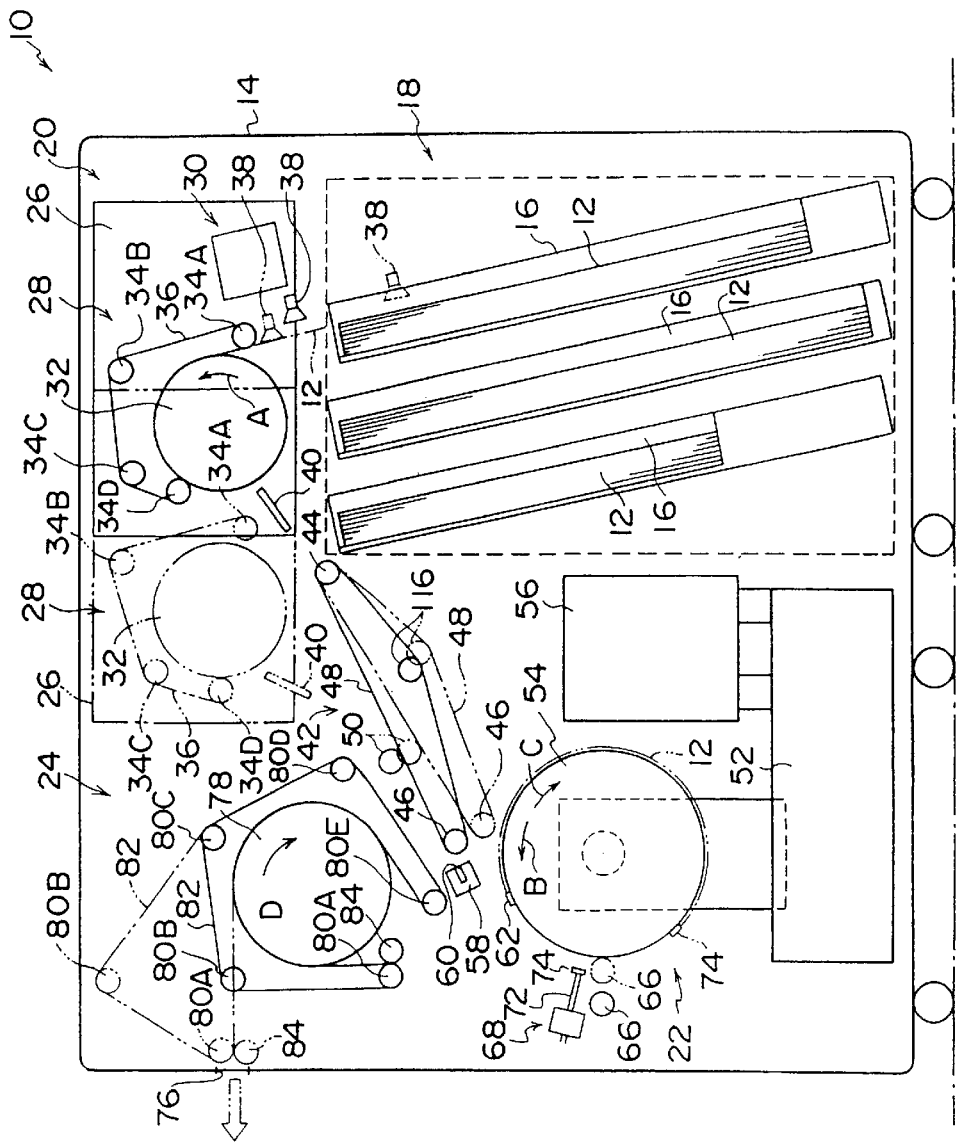
FIG. 1 is a schematic structural view of an image exposure apparatus of the present invention.

An embodiment of the present invention is explained referring to drawings hereinafter. FIG. 1 shows a schematic structure of an image exposure apparatus 10 that uses the present embodiment. This image exposure apparatus 10 employs a photosensitive lithographic printing plate (hereafter referred to as a "printing plate 12") in which, for example, a photosensitive layer is formed of a sheet-like photosensitive material on a support which is a rectangular sheet (for example, with a thickness of approximately 0.3 mm) formed of aluminum or the like. A light beam modulated based on image data is irradiated to the printing plate 12 to scanningly expose. In addition to the printing plate 12 in which image exposure is finished in the image exposure apparatus 10, developing processing or the like is implemented by an automatic developing apparatus or the like which is not shown.

In the image exposure apparatus 10, exposing image to printing plates 12 whose sizes (lengths and widths) are different is possible, and a plurality of cassettes are loaded, which respectively accommodates printing plates 12 of a different size therein. When a printing plate of a size for which the image exposure is to be implemented is set, the printing plates 12 are taken out one by one from a cassette in which the printing plates 12 of the corresponding size are accommodated, and the image exposure is implemented.

As shown in FIG. 1, in the image exposure apparatus 10, provided inside an casing 14 are a cassette loading section 18, a plate supply/transport section 20, a recording section 22, and a discharge buffer section 24. The cassette loading section 18 is arranged inside the casing 14, at the right lower side in FIG. 1, and a plurality of cassettes 16, each of which accommodates a plurality of printing plates 12, are loaded with the cassettes 16 being tilted at a predetermined angle.

In each cassette 16, printing plates 12 of one size are positioned and are accommodated such that the photosensitive layers face upward and one end of each printing plate 12 is at a predetermined position. Further, in the cassette loading section 18, the plurality of cassettes 16 are disposed at a predetermined interval, and loaded so that one end of each size of the accommodated printing plates 12 are at a substantially same height.

The plate supply/transport section 20 is arranged above the cassette loading section 18, and the recording section 22 is adjacent to the cassette loading section 18 and is arranged in a central lower part of the apparatus. A pair of side plates 26 (only one is shown in FIG. 1) is provided at the plate supply/transport section 20. A turning unit 28 and a sheet-feeding unit 30 are attached to the side plates 26.

The turning unit 28 is provided with a turning roller 32 with a predetermined outer diameter, and a plurality of small rollers (in the present embodiment, four small rollers 34A, 34B, 34C, 34D as an example) are provided around the turning roller 32. The small rollers 34A to 34D are arranged from the cassette loading section 18 side to the recording section 22 side over the turning roller 32, and an endless transport belt 36 is trained around the small rollers 34A to 34D. Thus, the transport belt 36 is trained around the part of the turning roller 32 between the small roller 34A and the small roller 34D, which is approximately halfway in the circumferential length of the turning roller 32.

The sheet-feeding unit 30 is provided with a plurality of suckers 38 that suck an upper end portion of one of the printing plates 12 inside the cassette 16. These suckers 38 are moved downward so as to face the upper end portion of the printing plate 12 inside the cassette 16 loaded in the cassette loading section 18 and suck the printing plate 12. Then, the sheet-feeding unit 30 moves the suckers 38 sucking the printing plate 12 substantially upward so that the printing plate 12 is drawn out from the cassette 16 and the leading end of the drawn-out printing plate 12 is inserted between the turning roller 32 and the transport belt 36. In FIG. 1, outlines of moving positions of the sucker 38 are shown by two-dot chain lines.

In the turning unit 28, the turning roller 32 and the transport belt 36 are rotated in a direction (an arrow A direction of FIG. 1) of drawing out the printing plate 12 from the cassette 16. In this way, the printing plate 12 is drawn out from the cassette 16 by being pinched by the turning roller 32 and the transport belt 36, and is wound on a peripheral surface of the turning roller 32. Thus, the printing plate 12, while being curved, is transported and is turned. The radius of the turning roller 32 is a size (for example, 100 mm or more) such that the printing plate 12 is not folded or bent when the printing plate 12 is curved.

As shown by solid lines and two-dot chain lines in FIG. 1, the side plates 26 move horizontally according to a position of the cassette 16 from which the printing plate 12 is taken out. Thus, the suckers 38 of the sheet-feeding unit 30 can correspond to the printing plate 12 inside the selected cassette 16.

A guide 40 is provided on the side plate 26 below the small roller 34D. The printing plate 12 turned by the turning roller 32 is fed from a part between the turning roller 32 and the transport belt 36 at the small roller 34D side to the guide 40. A transport conveyor 42 is arranged above the recording section 22, and the printing plate 12 fed out from the turning unit 28 is guided to the transport conveyor 42 by the guide 40.

The guide 40 swings according to the movement of the side plates 26 such that a guide direction for the printing plate 12 is constantly directed to the transport conveyor 42. The small roller 34D at the recording section 22 side moves so as to alter a feeding out direction of the printing plate 12 from the turning unit 28 in response to the movement of the side plates 26, and the small roller 34C moves so as to impart a substantially constant tension to the transport belt 36 when the small roller 34D moves. Thus, the printing plate 12 fed from the turning unit 28 is moderately curved by the guide 40.

In the transport conveyor 42, transport belts 48 are wound between a roller 44 adjacent to a lower part of the plate supply/transport section 20 and a roller 46 adjacent to an upper part of the recording section 22 and are tilted such that the roller 46 side is lower than the roller 44.

As shown in FIG. 1 and FIG. 2, in the transport conveyor 42, a roller 50 is arranged facing the transport belts 48 between the rollers 44 and 46. Thus, the printing plate 12 fed on the transport conveyor 42 is transported on the transport belts 48 while being pinched by the transport belts 48 and the roller 50.

In the recording section 22, a rotating drum 54 to which the printing plate 12 is attached is arranged on a frame 52, and a recording head section 56 is arranged adjacent to this rotating drum 54. In the image exposure apparatus 10, a puncher 58 is provided above the recording section 22 (the rotating drum 54).

As shown in FIG. 2, a bite opening 60 is formed in the puncher 58. In the transport conveyor 42, the printing plate 12 is pinched by the transport belts 48 and the roller 50, and the leading end of the printing plate 12 is inserted into the bite opening 60 of the puncher 58 and held.

The puncher 58 forms, for example, a notch for positioning at a predetermined position of the leading end of the printing plate 12 when the leading end of the printing plate 12 has been inserted into the bite opening 60.

The transport conveyor 42 reversely drives the transport belts 48 and draws the leading end of the printing plate 12 from the bite opening 60 of the puncher 58 when the notch has been formed in the printing plate 12. A swing device which is not shown is provided at the transport conveyor 42. The transport conveyor 42 is moved downward by the swing device with the roller 44 side as an axis such that the roller 46 side approaches the rotating drum 54 of the recording section 22 (shown by two-dot chain lines in FIG. 1 and FIG. 2) to feed the printing plate 12 on the transport belts 48 to a predetermined position of an outer peripheral surface of the rotating drum 54.

Figure 3:
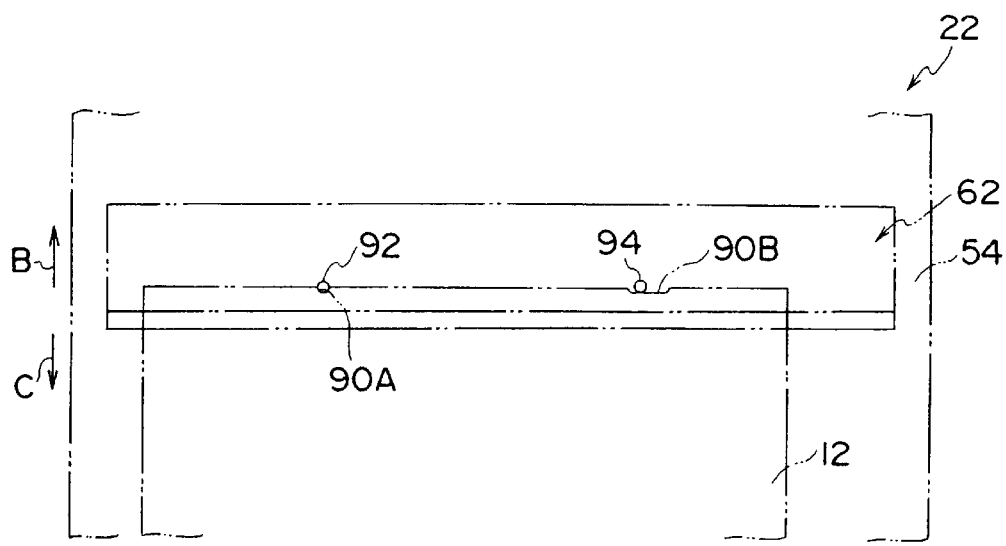
FIG. 3 is a schematic view showing positioning of a printing plate to a rotating drum of the present invention.

As shown in FIG. 3, in the image exposure apparatus 10, for example, a notch 90A and a notch 90B are formed in the leading end of the printing plate 12. While the notch 90A is formed in a semicircular shape, the notch 90B is a long half-hole in which a longer side is in a direction perpendicular to a transport direction of the printing plate 12. When the leading end of the printing plate 12 is fixed to the rotating drum 54, pins for positioning 92, 94 protruding at predetermined positions of the rotating drum 54 enter the respective notches 90A, 90B. Thus, the printing plate 12 is positioned with respect to the rotating drum 54.

As shown in FIG. 1 and FIG. 2, the rotating drum 54 is rotated in an attachment exposure direction (an arrow B direction of FIG. 1 and FIG. 2) of the printing plate 12 and in a detaching direction (an arrow C direction of FIG. 1 and FIG. 2) of the printing plate 12, which is the opposite direction to the attachment exposure direction, by a drive device which is not shown.

As shown in FIG. 2, a leading end chuck 62 is attached to a predetermined position on the outer peripheral surface of the rotating drum 54. In the recording section 22, when the printing plate 12 is attached to the rotating drum 54, first, the leading end chuck 62 stops the rotating drum 54 at a position (printing plate attachment position) to face the leading end of the printing plate 12 being fed by the transport conveyor 42.

An attachment cam 64 opposed to the leading end chuck 62 at the printing plate attachment position is provided in the recording section 22. This attachment cam 64 rotates such that one end side of the leading end chuck 62 is pressed, and it is possible to insert the printing plate 12 between the leading end chuck 62 and the peripheral surface of the rotating drum 54. Then, by putting the attachment cam 64 back to release the pressure working on the leading end chuck 62 with the leading end of the printing plate 12 inserted between the leading end chuck 62 and the rotating drum 54, the leading end of the printing plate 12 is pinched and is held between the leading end chuck 62 and the peripheral surface of the rotating drum 54.

When the leading end of the printing plate 12 is inserted between the leading end chuck 62 and the rotating drum 54, the pins 92 and 94 provided on the rotating drum 54 enter the notches 90A and 90B, respectively, and the printing plate 12 is held such that the plate 12 is positioned at a predetermined position of the rotating drum 54.

A squeeze roller 66 is disposed at a downstream side from the printing plate attachment position in the attachment exposure direction, in the vicinity of the peripheral surface of the rotating drum 54. This squeeze roller 66 moves toward the rotating drum 54 to press the printing plate 12 wound around the rotating drum 54 against the rotating drum 54.

In the recording section 22, when the leading end of the printing plate 12 is fixed on the rotating drum 54, the rotating drum 54 is rotated in the attachment exposure direction so that the printing plate 12 is wound around the rotating drum 54. At this time, the squeeze roller 66 presses the printing plate 12 against the peripheral surface of the rotating drum 54 such that the printing plate 12 tightly contacts the peripheral surface of the rotating drum 54.

In the recording section 22, a trailing end chuck attachment/detachment unit 68 is provided in a vicinity of the rotating drum 54 at an upstream side from the squeeze roller 66 relative to the attachment exposure direction, and a detachment cam 70 is arranged in the vicinity of the trailing end chuck attachment/detachment unit 68 in a downstream side in the attachment exposure direction. A trailing end chuck 74 is detachably provided at an end of a shaft 72 which protrudes toward the rotating drum 54 at the trailing end chuck attachment/detachment unit 68.

In the recording section 22, when the trailing end of the printing plate 12 wound around the rotating drum 54 reaches a trailing end chuck attachment/detachment position opposed to the trailing end chuck attachment/detachment unit 68, rotation of the rotating drum 54 is temporarily stopped and the trailing end chuck 74 is attached at a predetermined position of the rotating drum 54. Thus, the trailing end of the printing plate 12 wound around the rotating drum 54 is pinched and is fixed between the trailing end chuck 74 and the rotating drum 54 by the trailing end chuck 74.

In the recording section 22, when the printing plate 12 is positioned on and is wound around the rotating drum 54, the squeeze roller 66 is separated. While the rotating drum 54 is rotating at a high predetermined rotating speed, a light beam modulated based on image data is irradiated from the recording head section 56 to the printing plate 12 in synchronization with the rotation of the rotating drum 54. Thus, the printing plate 12 is scanningly exposed based on the image data, and an image is formed at a predetermined position.

In the recording section 22, when the scanning exposure of the printing plate 12 is finished, the rotating drum 54 is stopped such that the trailing end chuck stops at the trailing end chuck attachment/detachment position, and the printing plate 12 is pinched between the squeeze roller 66 and the rotating drum 54. Then, the trailing end chuck 74 is detached from the rotating drum 54 by the trailing end chuck attachment/detachment unit 68, and the trailing end of the printing plate 12 is released.

In the recording section 22, when the trailing end chuck 74 is detached from the rotating drum 54, the rotating drum 54 is rotated in the detaching direction of the printing plate 12. Thus, the printing plate 12 is fed out from a portion between the squeeze roller 66 and the rotating drum 54.

As shown in FIG. 1, the discharge buffer section 24 is provided above the squeeze roller 66. When the rotating drum 54 is rotated in the detaching direction of the printing plate 12, the printing plate 12 is fed out from the trailing end side thereof toward the discharge buffer section 24. In the recording section 22, when the rotating drum 54 is rotated in the detaching direction of the printing plate 12, and the leading end chuck 62 reaches the printing plate detaching position opposed to the detachment cam 70, the rotating drum 54 is stopped, and the detachment cam 70 is rotatively moved at this position. Thus, pinching of the leading end of the printing plate 12 between the leading end chuck 62 and the rotating drum 54 is released, and the printing plate 12 is detached from the rotating drum 54.

The discharge buffer section 24 is provided at the inner side of a discharge port 76 formed in the casing 14 and is provided with a discharge roller 78. In the vicinity of this discharge roller 78, a plurality of small rollers (small rollers 80A, 80B, 80C, 80D, 80E, for example) are arranged, and an endless transport belt 82 is trained between these small rollers 80A to 80E. Thus, the transport belt 82 is trained around the discharge roller 78 in a part between the small roller 80A and the small roller 80E, at a range between ½ to ¾ of the whole circumference of the discharge roller 78.

The small roller 80A is protruded toward the squeeze roller 66 side of the recording section 22, and a roller 84 is disposed opposing the small roller 80A. The printing plate 12 fed from the recording section 22 is guided to and is pinched between the small roller 80A and the roller 84.

In the discharge buffer section 24, by rotatively driving the discharge roller 78 in a drawing-in direction (an arrow D direction) of the printing plate 12, while the printing plate 12 pinched by the small roller 80A and the roller 84 is drawn from the recording section 22, the printing plate 12 is guided between the discharge roller 78 and the transport belt 82 to be pinched thereby and to be wound around the discharge roller 78. At this time, in the discharge buffer section 24, when an end portion of the printing plate 12 (an end that was the trailing end side at the time when the printing plate 12 was fed from the recording section 22) is pinched by the small roller 80A and the roller 84, the discharge roller 78 is stopped such that the printing plate 12 wound around the discharge roller 78 is temporarily held.

As shown by two-dot chain lines in FIG. 1, in the discharge buffer section 24, the small roller 80A and the roller 84 move toward positions opposed to the discharge port 76. At this time, since the small roller 80A and the roller 84 rotatively move integrally, the leading end of the printing plate 12 is directed toward the discharge port 76. The small roller 80B above the small roller 80A moves and follows the movement of the small roller 80A such that a constant tension is imparted to the transport belt 82.

In the discharge buffer section 24, when the leading end of the printing plate 12 is directed toward the discharge port 76, the discharge roller 78 is rotatively driven in a feeding out direction of the printing plate 12 (the opposite direction to the arrow D direction) at a rotating speed corresponding to a transport speed of the printing plate 12 when transported by a processing device arranged adjacent to the discharge port 76, such as an automatic developing apparatus. Thus, the printing plate 12 is fed from the discharge port 76.

In the image exposure apparatus 10, before the printing plate 12 is inserted into the bite opening 60 of the puncher 58 by the transport conveyor 42, positioning of the printing plate 12 is implemented. Then, the notches 90A and 90B for positioning the printing plate 12 on the rotating drum 54 are formed at predetermined positions of the printing plate 12 by the bite opening 60 of the puncher 58.

Figure 4:
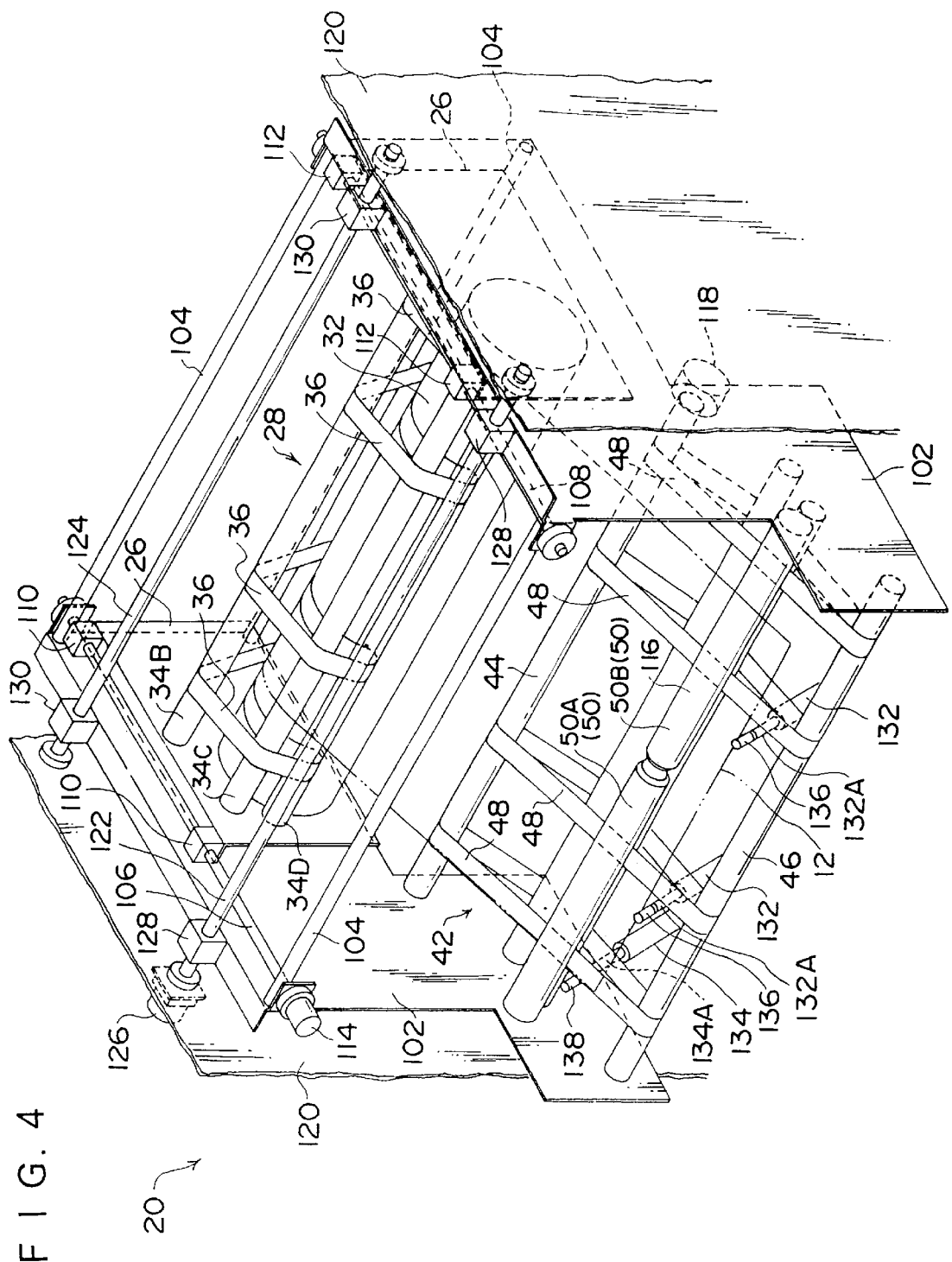
FIG. 4 is a schematic perspective view showing a main part of a plate supply/transport section of the present invention.
Figure 5:
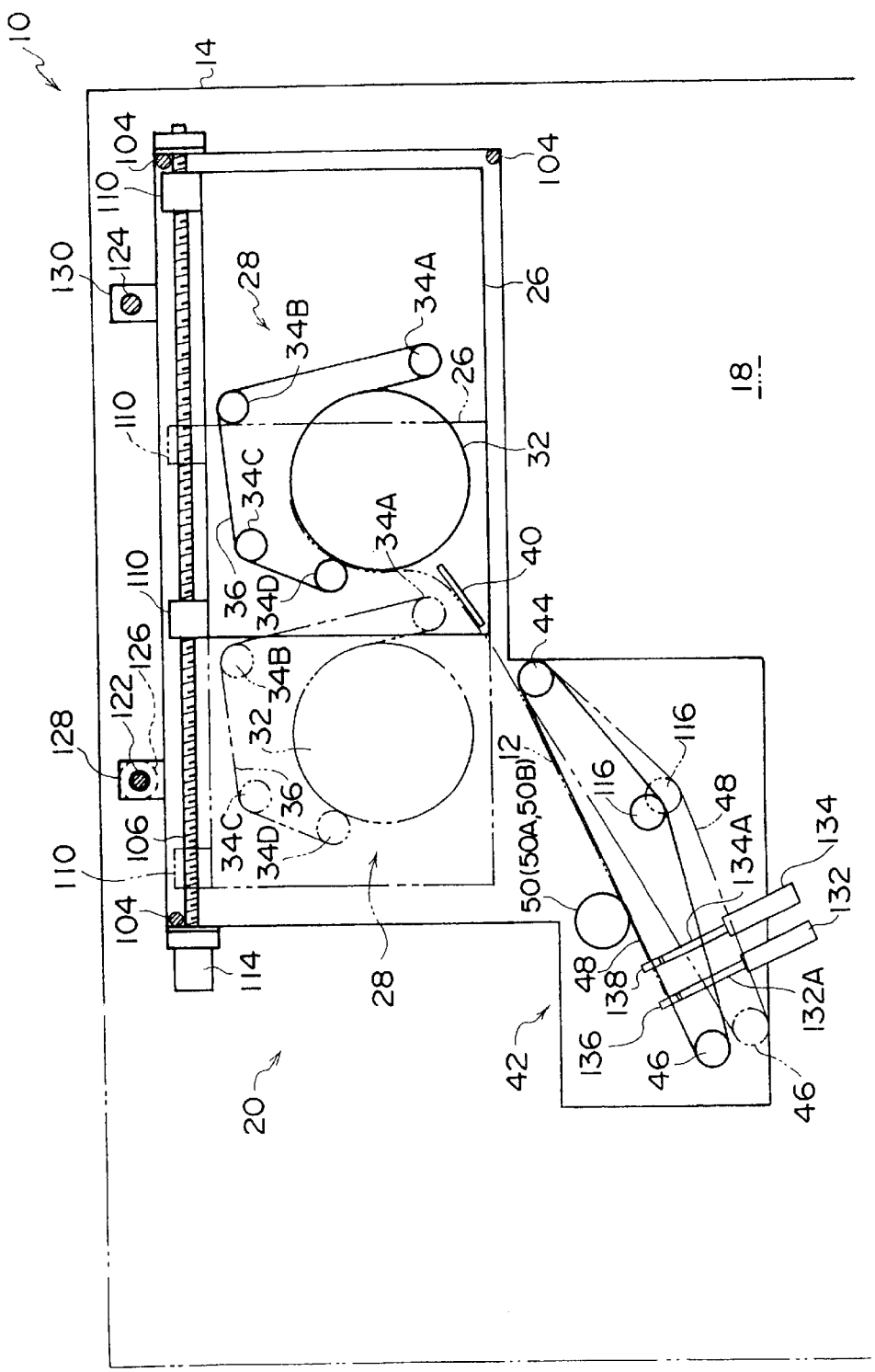
FIG. 5 is a schematic structural view showing the main part of the plate supply/transport, seen from one end side of the width direction of the printing plate.

FIG. 4 and FIG. 5 show a schematic structure of the plate supply/transport section 20 in which the turning unit 28 and the transport conveyor 42 are provided as a transport device. In the plate supply/transport section 20, a pair of frame plates 102 are provided, and between these frame plates 102 are arranged the side plates 26 which are provided with the turning unit 28 and the sheet-feeding unit 30 (whose drawing is omitted in FIG. 4 and FIG. 5), and the transport conveyor 42. The frame plates 102 are connected to each other by a plurality of stays 104, and thus a predetermined shape is maintained.

A feed screw 106 is provided at one of the pair of frame plates 102, and a guide shaft 108 is provided at the other. The feed screw 106 and the guide shaft 108 are attached at upper end portions of the frame plates 102 such that their axial directions are horizontal and are mutually parallel along a direction perpendicular to the axial direction of the turning roller 32.

The feed screw 106 is screwed through a plurality of feed nuts 110, and the respective feed nuts 110 are attached to upper end portions of the side plate 26 which is provided with the turning unit 28. As shown in FIG. 4, the guide shaft 108 is inserted through a plurality of sliders 112, and the respective sliders 112 are attached to the side plate 26 at predetermined intervals. Thus, the side plates 26 are supported by the frame plates 102.

A moving motor 114 is attached to the frame plate 102 at the feed screw 106 side, and this moving motor 114 is coupled with the feed screw 106. The feed screw 106, the guide shaft 108, and the moving motor 114 form a moving mechanism for the side plates 26. When the feed screw 106 is rotated by drive of the moving motor 114, the feed nuts 110 through which the feed screw 106 is screwed are moved relatively along the axial direction of the feed screw 106 so that the side plates 26 move horizontally above the cassette loading section 18.

As shown in FIG. 4 and FIG. 5, in the transport conveyor 42, each of the rollers 44 and 46 and the roller 50 is rotatably supported by the frame plates 102 via bearings which are not shown. A tension roller 116 is arranged below a portion between the rollers 44, 46 and is rotatably supported by the frame plates 102.

The transport belts 48 are provided at predetermined intervals along the axial direction of the rollers 44 and 46 and the tension roller 116, and are trained between the rollers 44 and 46 and the tension roller 116.

As shown in FIG. 4, in the transport conveyor 42, for example, a transport motor 118 is coupled with the roller 44, and, by the drive of this transport motor 118, the transport belt 48 is rotatively driven together with the roller 44 so that the printing plate 12 placed on the transport belt 48 is transported.

The roller 50 arranged at a predetermined position between the rollers 44 and 46 facing the transport belt 48 is divided into rollers 50A and 50B along a direction perpendicular to the transport direction of the printing plate 12, (hereinafter, width direction of the printing plate 12) rollers 50A, 50B which are able to be rotated relatively.

The roller 50A is opposed to one end side of the printing plate 12 transported on the transport conveyor 42 and the roller 50B is opposed to the other end side thereof in the width direction, regardless of the width of the printing plate 12 along the width direction. That is, one end side in the width direction of the printing plate 12 is pinched by the roller 50A and the transport belt 48 opposed to the roller 50A, and the other end side is pinched by the roller 50B and the transport belt 48 opposed to the roller 50B. Thus, the one end side and the other end side in the width direction of the printing plate 12 on the transport conveyor 42 can move relatively.

A pair of support plates 120 are attached to support the pair of frame plates 102 inside the casing 14 (whose drawing is omitted) of the image exposure apparatus 10. A feed screw 122 and a guide shaft 124 are rotatably supported between the support plates 120. A positioning motor 126 is coupled with one end of the feed screw 122, and the feed screw 122 is rotated by drive of the positioning motor 126.

A feed nut 128 corresponding to the feed screw 122 and a slider 130 corresponding to the guide shaft 124 are respectively attached to the frame plates 102. The feed screw 122 is screwed through the feed nuts 128, and the guide shaft 124 is inserted through the sliders 130 so that the sliders are movable along the axial direction of the guide shaft 124.

Thus, the frame plates 102 are supported by the support plates 120 via the feed screw 122 and the guide shaft 124. The positioning motor 126 is driven so that the feed screw 122 is rotated, whereby the frame plates 102, together with the turning unit 28 and the transport conveyor 42, both of which are attached to the frame plates 102, are moved parallel along the width direction of the printing plate 12.

As shown in FIG. 4 and FIG. 5, air cylinders 132, 134 are provided below the transport conveyor 42 between the frame plates 102. As shown in FIG. 4, the air cylinders 132 are arranged as a pair along a direction perpendicular to the transport direction of the printing plate 12, and pin rollers 136 are provided as a first positioning device at extremities of respective rods 132A.

The rods 132A of the air cylinders 132 are extended from a part between the rollers 46 and 50 (50A and 50B) such that the pin rollers 136 are protruded so as to be opposed to the leading end of the printing plate 12 moving on the transport belt 48. The two pin rollers 136 are arranged so as to be opposed to respective end portions in the width direction of the printing plate 12. Thus, the printing plate 12 abuts the two pin rollers 136 such that skew of the printing plate 12 with respect to the transport direction is corrected. That is, the printing plate 12 is positioned by the pin rollers 136 along the transport direction.

In the image exposure apparatus 10, when the leading end of the printing plate 12 abuts the pin rollers 136, if the printing plate 12 has a long length along the transport direction, a state occurs in which the trailing end side is wound around the turning roller 32 of the turning unit 28.

At the air cylinder 134, a pin roller 138 is provided as a second positioning device at an extremity of a rod 134A. The rod 134A of the air cylinder 134 is extended such that the pin roller 138 is protruded at a predetermined position opposed to one end side in the width direction of the printing plate 12 transported on the transport belts 48.

The transport conveyor 42 is moved along the width direction together with the frame plates 102 by the drive of the positioning motor 126, and one end side of the printing plate 12 in the width direction is abutted against the pin roller 138 so that the printing plate 12 on the transport belt 48 is positioned along the direction perpendicular to the transport direction on the transport conveyor 42.

That is, in the plate supply/transport section 20, the printing plate 12 is abutted against the pin rollers 136 and the pin roller 138 at the transport conveyor 42 so that positioning along the transport direction and a direction perpendicular to the transport direction is implemented. In the image exposure apparatus 10, the cassette 16 accommodating the printing plate 12 is positioned and is loaded beforehand such that the printing plate 12 fed to the transport conveyor 42 by the turning unit 28 is located at the inner side in the width direction from the pin roller 138.

In the image exposure apparatus 10, the transport motor 118 is driven, and the leading end of the printing plate 12 whose positioning is finished is inserted into the bite opening 60 of the puncher 58 so that the notches 90A and 90B for positioning are formed at predetermined positions of the leading end of the printing plate 12.

As shown in FIG. 5, the respective air cylinders 132 and 134 are attached at positions where the pin rollers 136 and 138 can retract to positions such that the pin rollers 136 and 138 do not come into contact with the transport belts 48 and the printing plate 12 moving on the transport belts 48 when the rods 132A, 134A are retracted.

When the printing plate 12 is to abut the pin rollers 136 or 138 to be positioned, whether or not the printing plate 12 has reached the position where the printing plate 12 abuts the pin rollers 136 or 138 may be read, for example, by a sensor which is not shown. Treating the respective pin rollers 136 as 138 as electrodes, whether or not an electrically conductive support of the printing plate 12 abuts the pin rollers 136 and 138 may be detected from an electrical condition between the pin rollers 136 and 138. Such a method is not limited to the methods described above, and known methods in the art may be employed.

Interactions of the present embodiment are explained below.

In the image exposure apparatus 10, after image data to be exposed to the printing plate 12 has been inputted, the size, the number of exposures, and the like of the printing plate 12 to be image exposed are set, and, after the image exposure is instructed to start, image exposure processing of the printing plate 12 is started. The processing may be instructed by switch operations on a console panel provided at the image exposure apparatus 10, or may be instructed by a signal from an image processing device or the like that outputs image data to the image exposure apparatus 10.

In the image exposure apparatus 10, when the processing is instructed to start, the printing plate 12 having a specified size is pulled out from the cassette 16 and is placed on the transport conveyor 42. After the notches 90A and 90B for positioning are formed, the printing plate 12 is supplied to the recording section 22.

In the recording section 22, when the leading end of the supplied printing plate 12 is held on the rotating drum 54 by the leading end chuck 62, the printing plate 12 is wound around the rotating drum 54 while being squeezed by the squeeze roller 66, and the trailing end of the printing plate 12 is held on the rotating drum 54 by the trailing end chuck 74. At this time, the pins 92 and 94 provided in the rotating drum 54 enter the notches 90A, 90B formed in the leading end of the printing plate 12, so that the printing plate 12 is positioned on the rotating drum 54.

Then, in the recording section 22, while the rotating drum 54 is rotating in high-speed, a light beam based on the image data is irradiated from the recording head section 56 to the printing plate 12 such that the printing plate 12 is scanningly exposed. Thus, an image is formed on a predetermined area of the printing plate 12. When the scanning exposure is finished, the printing plate 12 is removed from the rotating drum 54, is discharged from the recording section 22, and is fed at a predetermined speed from the discharge port 76 via the discharge buffer section 24.

In the image exposure apparatus 10, when the printing plate 12 removed from the cassette 16 of the cassette loading section 18 is fed from the turning unit 28 of the plate supply/transport section 20 to the transport conveyor 42, the leading end of the printing plate 12 is positioned on the transport conveyor 42.

Here, positioning of the printing plate 12 in the plate supply/transport section 20 of the image exposure apparatus 10 is explained.

In the plate supply/transport section 20 of the image exposure apparatus 10, driving of the transport motor 118 is started in synchronization with drawing of the printing plate 12 drawn from the cassette 16, employing the sheet-feeding unit 30 and the turning unit 28. At the same time, in the plate supply/transport section 20, the air cylinders 132, 134 are operated such that the pin rollers 136 and 138 for positioning are protruded at the transport path of the printing plate 12, at predetermined positions adjacent to the transport path.

The printing plate 12 pinched by the turning roller 32 and the transport belt 36 and drawn from the cassette 16 is turned by being wound around the turning roller 32. Thus, a travelling direction of the printing plate 12 is turned toward the transport conveyor 42, and the printing plate 12 is fed toward the transport conveyor 42.

In the transport conveyor 42, when the leading end of the printing plate 12 is placed on the transport belts 48 rotatively driven by the transport motor 118, the printing plate 12 is pinched by the roller 50 (50A and 50B) and the transport belts 48 and is transported to the puncher 58.

At this time, the leading end of the printing plate 12 transported on the transport belts 48 abuts, in front of the roller 46, the pin rollers 136 protruding between the transport belts 48, and is stopped. That is, the printing plate 12 abuts the pin rollers 136 such that slip occurs between the printing plate 12 and the transport belts 48, and thus even when the transport belts 48 are rotatively driven, movement of the printing plate 12 is stopped.

Here, if the printing plate 12 is skewed with respect to the transport direction, one end portion side in the width direction of the printing plate 12 is first abutted such that the printing plate 12 stops. At this time, in the transport conveyor 42, since the end portions in the width direction of the printing plate 12 are separately pinched by the rollers 50A, 50B and the transport belts 48, the other end portion side of the printing plate 12, which is not abutting the pin roller 136, is then transported toward the pin roller 136. Thus, the leading end of the printing plate 12 is rotatively moved on the transport conveyor 42, and a skew with respect to the transport direction is remedied.

In a case when the length of the printing plate 12 is long, the trailing end of the printing plate 12 is still wound around the turning roller 32 and is in a state such that the plate 12 is pinched by the turning roller 32 and the transport belt 36. At this time, when the leading end of the printing plate 12 abuts the pin rollers 136, slip occurs between the printing plate 12 and the surface of the turning roller 32, and feeding of the printing plate 12 from the turning unit 28 is stopped. Here, the transport belts 36 are arranged on the turning roller 32 along the width direction of the printing plate 12 (the axial direction of the turning roller 32) at predetermined intervals, similarly to the transport conveyor 42. Thus, since both end portions in the width direction of the printing plate 12 are transported to the transport conveyor 42 by individual transport belts 36, even when one end portion side in the width direction of the printing plate 12 abuts one of the pin rollers 136 first, the other end portion side is transported to the pin roller 136 until it abuts the other pin roller 136.

Therefore, even when the length along the transport direction of the printing plate 12 is long, skew of the printing plate 12 is remedied from the leading end to the trailing end along the transport direction.

When skew of the printing plate 12 with respect to the transport direction is remedied, the leading end of the printing plate 12 abuts the two respective pin rollers 136 so that the printing plate 12 is positioned along the transport direction on the transport conveyor 42.

In the plate supply/transport section 20, when the leading end of the printing plate 12 abuts the two pin rollers 136, the drive of the transport motor 118 and the rotation of the turning roller 32 are temporarily stopped. After this, in the plate supply/transport section 20, the positioning motor 126 is driven so that the transport conveyor 42 and the turning unit 28, together with the frame plates 102, are integrally moved along the width direction of the printing plate 12. Thus, the printing plate 12 placed on the transport belts 48 is moved parallel toward the pin roller 138, and an end portion in the width direction of the printing plate 12 abuts the pin roller 138 so that the printing plate 12 is positioned in the width direction. At this time, since the transport conveyor 42 and the turning unit 28, together with the frame plates 102, are translated parallel as a whole by the feed screw 122 and the guide shaft 124, the printing plate 12 does not re-skew with respect to the transport direction, and the printing plate 12 is positioned with respect to the width direction in the state where the printing plate 12 is positioned with respect to the transport direction.

In the plate supply/transport section 20, when the printing plate 12 abuts the two pin rollers 136 and the pin roller 138 to implement positioning, the respective air cylinders 132 and 134 are operated such that the pin rollers 136 and 138 are retracted from the transport path of the printing plate 12. Then, the transport motor 118 is driven, and the leading end of the printing plate 12 is inserted into the bite opening 60 of the puncher 58. At this time, since the transport conveyor 42 and the turning unit 28 together with the frame plates 102 are integrally moved parallel along the width direction of the printing plate 12, the printing plate 12 is inserted into the bite opening 60 of the puncher 58 in a state in which the printing plate 12 is positioned with respect to the width direction.

The printing plate 12 is inserted into the bite opening 60 of the puncher 58 in a state where the printing plate 12 is positioned such that the notches 90A and 90B for positioning can be precisely formed at predetermined positions of the printing plate 12, and the printing plate 12 can be precisely arranged with respect to the rotating drum 54.

In the plate supply/transport section 20 in which positioning of the printing plate 12 is implemented, since the transport conveyor 42 on which the printing plate 12 is placed is tilted, space necessary for positioning can be reduced compared to a case in which the printing plate 12 is positioned in an approximately horizontal state. If the size of the printing plate 12 along the transport direction is long, because positioning can be implemented in a state where the trailing end side of the printing plate 12 is wound around the turning roller 32, positioning can be implemented even in a small space, approximately similar to the case of the printing plate 12 having a short size along the transport direction. Therefore, an installation area of the image exposure apparatus 10 in which the image exposure is implemented while the printing plate 12 is wound around the rotating drum can be greatly reduced, and the image exposure apparatus 10 can be formed compactly.

Thus, the space necessary for positioning can be greatly reduced, compared to a case in which the printing plate 12 is supported in a horizontal state for positioning.

In the present embodiment explained above, the transport belts 48 of the transport conveyor 42 are rotatively driven so that positioning is implemented with respect to the transport direction of the printing plate 12. However, the rollers 50A and 50B may be rotatively driven so that the printing plate 12 fed between the rollers 50A, 50B and the transport belts 48 may be transported.

In this case, since the rollers 50A and 50B are divided between right and left in a direction perpendicular to the transport direction of the printing plate 12, the end portions in the width direction of the printing plate 12 can be individually moved. By rotatively driving the rollers 50A and 50B in synchronization with each other, the printing plate 12 can be transported along the transport direction straight.

In the present embodiment, although the printing plate 12 is positioned on the transport conveyor 42 by making the leading end in the transport direction and one end side in the width direction of the printing plate 12 abut the pin rollers 136, 138, the invention is not limited to this, and the printing plate 12 may be positioned by detecting a peripheral portion of the printing plate 12, for example, by employing a sensor.

In this case, the position of the printing plate 12 may be remedied by moving both ends in the width direction of the printing plate 12 by individual drive sources, such as, for example, by individually driving the rollers 50A and 50B.

In the present embodiment, although the transport conveyor 42 and the turning unit 28 are moved parallel along the width direction of the printing plate 12 by the moving mechanism composed of the positioning motor 126, the feed screw 122, and the guide shaft 124, the moving mechanism along the width direction of the printing plate 12 is not limited to this, and a freely selected structure known in the art can be applied.

The present embodiment explained above shows one example of the present invention and does not limit structure of the present invention. In the present invention, a photosensitive material is not limited to the printing plate 12, and various photosensitive materials, such as photographic film, photographic printing paper and the like, can be wound around the rotating drum to be subjected to positioning of the photosensitive material when image exposure is to be implemented.

As explained above, with the present invention, since positioning is implemented while the photosensitive material is held in a tilted state, positioning in a small space becomes possible and transport of the photosensitive material whose positioning has finished becomes easy, compared to a case in which the photosensitive material is positioned in a horizontal state. Further in the present invention, since the leading end side of the photosensitive material is tilted and the trailing end side is wound around the roller, even a photosensitive material whose length along the transport direction is long can be positioned in an extremely small space. Thus, even when a photosensitive material whose length along the transport direction is long is scanningly exposed, an excellent advantageous effect of the invention is that an extremely compact apparatus can be obtained.

What is claimed is:

1. An image exposure apparatus for enabling positioning of a sheet-like photosensitive material at a rotating drum by positioning the photosensitive material at a predetermined position before the photosensitive material is wound onto a peripheral surface of the rotating drum in order to be scanningly exposed, the image exposure apparatus comprising:

a transport device which imparts transport force to each of two end portions in a width direction of the photosensitive material, which width direction is perpendicular to a transport direction of the photosensitive material, and transports the photosensitive material while maintaining the photosensitive material in a state in which the photosensitive material is tilted at a predetermined inclination;

a first positioning device which stops each of two end portions in the width direction of a leading end of the photosensitive material, which is transported by the transport device, at a predetermined position;

a moving device which moves the transport device and the photosensitive material integrally along the width direction of the photosensitive material after the photosensitive material has been stopped at the predetermined position by the first positioning device; and a second positioning device which stops the photosensitive material, which is moved by the moving device, at a predetermined position.

2. The image exposure apparatus of claim 1, wherein the transport device comprises:

a plurality of transport belts provided substantially perpendicular to the direction in which the photosensitive material is transported, with the transport belts being disposed at predetermined intervals along the width direction of the photosensitive material; and a transport roller provided substantially perpendicular to the direction in which the photosensitive material is transported, with the transported roller disposed to face each of end portions in the width direction of the photosensitive material, the transport roller pinches the photosensitive material between the transport belts and the transport rollers and to impart a transporting force to the photosensitive material.

3. The image exposure apparatus of claim 2, wherein the transport device comprises a winding device which winds the photosensitive material around a roller and feeds the photosensitive material toward the transport belt, and the moving device moves the winding device and the transport belts integrally.

4. The image exposure apparatus of claim 3, wherein the winding device comprises a plurality of winding belts arranged at predetermined intervals along an axial direction of the roller, and the photosensitive material is pinched and fed out by the roller and the winding belts.

5. The image exposure apparatus of claim 1, further comprising a puncher which forms a notch for positioning in the photosensitive material.

6. The image exposure apparatus of claim 1, wherein the first positioning device comprises an air cylinder, a rod, and a pin roller.

7. The image exposure apparatus of claim 1, wherein the second positioning device comprises an air cylinder, a rod, and a pin roller.

8. The image exposure apparatus of claim 1, wherein the rotating drum comprises a pinch device which detachably fixes the photosensitive material to the rotating drum.

9. The image exposure apparatus of claim 1, wherein the moving device comprises a positioning motor, a feed screw, and a guide shaft.

10. The image exposure apparatus of claim 1, wherein the transport device transports the photosensitive material toward one of a puncher and the rotating drum in a state in which the photosensitive material has been moved in the width direction thereof by the moving device.

11. The image exposure apparatus of claim 1 further comprising at least one cassette which accommodates the photosensitive material.

12. The image exposure apparatus of claim 11, wherein a winding device moves horizontally along the transport direction.

13. The image exposure apparatus of claim 12, wherein the transport device adjusts an angle thereof interlocking with the horizontal movement of the winding device.

14. The image exposure apparatus of claim 13, wherein the winding device comprises a guide plate which guides the photosensitive material toward the transport device.

15. The image exposure apparatus of claim 14, wherein the guide plate adjusts an angle thereof interlocking with the horizontal movement of the winding device.

16. The image exposure apparatus of claim 2, wherein the transport roller is divided into a plurality of rollers along a direction substantially perpendicular to the transport direction of the photosensitive material.

17. The image exposure apparatus of claim 16, wherein the plurality of rollers into which the transport roller is divided are rotatable relative to each other.

* * * * *